United States Patent
Hamlin

(10) Patent No.: US 9,420,914 B2
(45) Date of Patent: Aug. 23, 2016

(54) GRILL CONVERSION METHOD AND APPARATUS

(71) Applicant: Edward W Hamlin, Altamonte Springs, FL (US)

(72) Inventor: Edward W Hamlin, Altamonte Springs, FL (US)

(*) Notice: Subject to any disclaimer, the term of this patent is extended or adjusted under 35 U.S.C. 154(b) by 358 days.

(21) Appl. No.: 14/264,560

(22) Filed: Apr. 29, 2014

(65) Prior Publication Data

US 2015/0305560 A1 Oct. 29, 2015

(51) Int. Cl.
*A47J 37/07* (2006.01)
*A47J 36/34* (2006.01)

(52) U.S. Cl.
CPC ............. *A47J 37/0713* (2013.01); *A47J 36/34* (2013.01); *A47J 2201/00* (2013.01)

(58) Field of Classification Search
CPC .. A47J 37/0713; A47J 36/34; A47J 2201/00; A47J 36/36; B23P 19/00
See application file for complete search history.

(56) References Cited

U.S. PATENT DOCUMENTS

| | | | |
|---|---|---|---|
| 4,819,614 A | 4/1989 | Hitch | |
| 5,878,739 A | 3/1999 | Guidry | |
| 6,161,534 A | 12/2000 | Kronman | |
| 6,173,644 B1 | 1/2001 | Krall | |
| 6,640,695 B2 * | 11/2003 | Stark | A47J 37/0786 |
| | | | 126/273.5 |
| D592,908 S | 5/2009 | Hamlin | |
| D594,276 S | 6/2009 | Hamlin | |
| D604,098 S | 11/2009 | Hamlin | |
| 7,686,010 B2 * | 3/2010 | Gustavsen | F24B 1/003 |
| | | | 126/25 R |
| D700,803 S | 3/2014 | Hamlin | |
| 2003/0101981 A1 | 6/2003 | Cushing | |
| 2008/0053427 A1 | 3/2008 | McGinness | |
| 2011/0073098 A1 * | 3/2011 | Chang | A47J 37/0704 |
| | | | 126/25 B |
| 2012/0192722 A1 | 8/2012 | Foster | |

* cited by examiner

*Primary Examiner* — Alfred Basichas
(74) *Attorney, Agent, or Firm* — William M. Hobby, III

(57) ABSTRACT

The present invention relates to a method of converting a charcoal grill to a gas grill having a stove top and to a grill plate used in the conversion which allows the grill to have a stove top to support a cooking container for cooking foods in containers thereon while controlling the heat on the stove top.

16 Claims, 2 Drawing Sheets

GRILL CONVERSION METHOD AND APPARATUS

FIELD OF THE INVENTION

This invention relates to a grill conversion method and apparatus for converting a charcoal grill to a gas grill using a stove plate for converting a grill to a stove or cook top.

BACKGROUND OF THE INVENTION

A barbeque grill is a device for cooking food by applying heat directly below a grill grate. There are several varieties of grills but most fall into one of two categories, either gas fueled or charcoal. Barbequing is a pervasive tradition in much of the world. Gas fueled grills typically use propane (LP) or natural gas (NG) as a fuel source, with the gas flame either cooking the food directly or heating grilling elements which in turn radiate the heat necessary to cook the food. Grilling has become a popular method of cooking food due to the unique flavors and texture imparted to the food during the grilling process. Grilling can be performed outdoors or indoors using gas.

The present invention relates to a method of converting a charcoal grill to a gas grill and to the stove plate used in the conversion which converts the grill to a stove top.

In my prior U.S. Design Pat. No. D604,098 a round grill plate with radially extending arms extending from the outer rim towards the center thereof is shown. My Design Pat. No. D594,276 is for a Grill Plate while my Design Pat. No. D592,908 is for a Griddle Grate and my prior Design Pat. No. D700,803 is for a Griddle Plate. My U.S. patent application Ser. No. 13/911,269 filed Jun. 6, 2013 is for a griddle plate for a gas grill which controls the heat from the gas grill flames with a grate on the bottom side thereof which grate forms a cooking container support for baking goods on the gas grill when the griddle plate is turned bottom side up.

Other prior art may be seen in U.S. Patent Application Publication No. 2012/0192722 for a convertible grill and smoker in which a smoker converts into a grill and can also be used as a smoker and fireplace. The Krall U.S. Pat. No. 6,173,644 is for an apparatus for converting a gas grill into a charcoal burning grill. The Hitch U.S. Pat. No. 4,819,614 is a dual fuel barbecue grill assembly having a dual mode of operation for cooking with charcoal briquettes or with a gas burner. The Kronman U.S. Pat. No. 6,161,534 is for a method and apparatus for converting a gas grill or a charcoal burning grill. The Guidry U.S. Pat. No. 5,878,739 is for a combination gas and charcoal grill. The McGinness U.S. Patent Application Publication No. 2008/0053427 is a food cooking grill allowing for an alternative fuel source to be utilized. The Cushing U.S. Patent Application Publication No. 2003/0101981 allows a grill to reduce the concentration of heat to a smaller area in a gas or charcoal grill with a formed metal hood fitted within the grill directly over a heat source having a chimney to reduce the amount of fuel required to cook food.

SUMMARY OF THE INVENTION

A method of converting a charcoal to a gas grill is taught which includes first selecting a charcoal grill having a housing having a top portion and a bottom portion, the bottom portion having an air inlet and the top portion having an opening cover having an outlet therethrough and having a grilling grate therein. A gas burner is selected and has a gas hose or line for feeding gas to the burner from a gas supply. The gas burner is attached to the charcoal grill through the air inlet in the bottom portion of the housing. A stove plate is selected that is shaped to generally cover the grate in the grill housing and which acts as a stove top. The selected stove plate has a covering plate portion having an center opening therethrough and a container supporting ring encircling the center opening. The container supporting ring is shaped to support a cooking container. A plurality of legs are used to space the supporting ring from the covering plate to thereby allow heat to pass through the covering plate center opening and pass between the container supporting ring and the cover plate when the container supporting ring is supporting a container. The charcoal grill cover is opened and the stove plate is positioned over the grate to thereby convert a charcoal grill to a gas grill.

The stove plate of the present invention is shaped to generally cover a grilling grate in a grill to make a stove top for cooking in a container on the grill. A covering plate portion has a center opening therethrough and a container supporting ring encircling the center opening. The container supporting ring is shaped to support a cooking container and has a plurality of legs spacing the supporting ring from the covering plate to thereby allow heat passing through the covering plate center opening when the stove plate is mounted in a grill to pass between the container supporting ring and the cover plate when the container supporting ring is supporting a container. The stove plate has a generally truncated conical bottom plate having an open center attached under the cover plate for directing rising heat when the stove plate is mounted in a grill to pass rising heated air into the cover plate center opening.

BRIEF DESCRIPTION OF THE DRAWINGS

The accompanying drawings, which are included to provide further understanding of the invention are incorporated in and constitute a part of the specification, and illustrate an embodiment of the invention and together with the description serve to explain the principles of the invention.

In the drawings.

DETAILED DESCRIPTION OF EXEMPLARY EMBODIMENT

Figure 1:
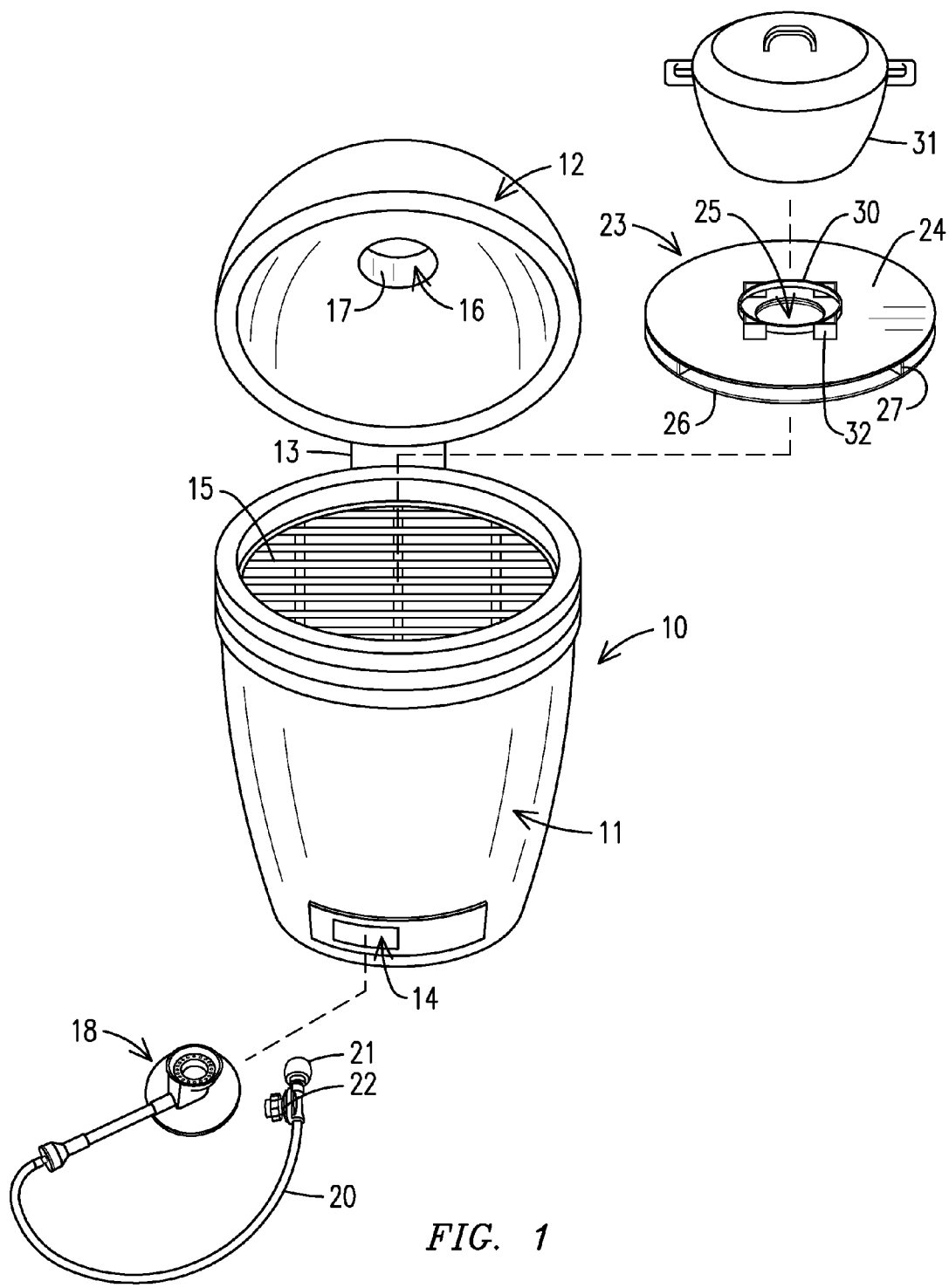
FIG. 1 is a an exploded perspective view of a charcoal grill converted to a gas grill in accordance with the present invention.

The present invention is for a method of converting a charcoal grill to a gas grill having a stove top. A stove top plate is used in the conversion which allows the grill grate to support a cooking container for cooking food therein while directing the heated air and isolating the burner flames from the cooking container. As seen in FIG. 1, a charcoal grill 10 is of the type having a generally ovate or egg shape which is generally made of a ceramic material and is used for grilling and smoking. The grill body 11 has a hinged cover 12 which opens on hinge 13. The body 11 has an air opening 14 which allows air to pass into the grill bottom portion where it is heated and rises in the body 11 and through the grill grate 15. Grilling is accomplished on the grate with the cover 12 open and the grill 10 can be used for smoking by closing the grill cover 12. The grill top has an opening 16 and may have a stack 17. The body 11 may be made of a thick ceramic material which when heated retains and radiates heat in the cooking process.

The charcoal grill is converted to a gas grill with a stove top connecting a gas burner 18 having a gas line 21 connected thereto and a connector 21 on the end of the gas line which is a standard connector for connecting to a propane tank or the like. The connector may also have a shutoff valve 22. The gas burner 18 is inserted through the air opening 14 and held in the bottom of the grill body 11 to provide a gas flame for grilling on the grate 15.

Figure 2:
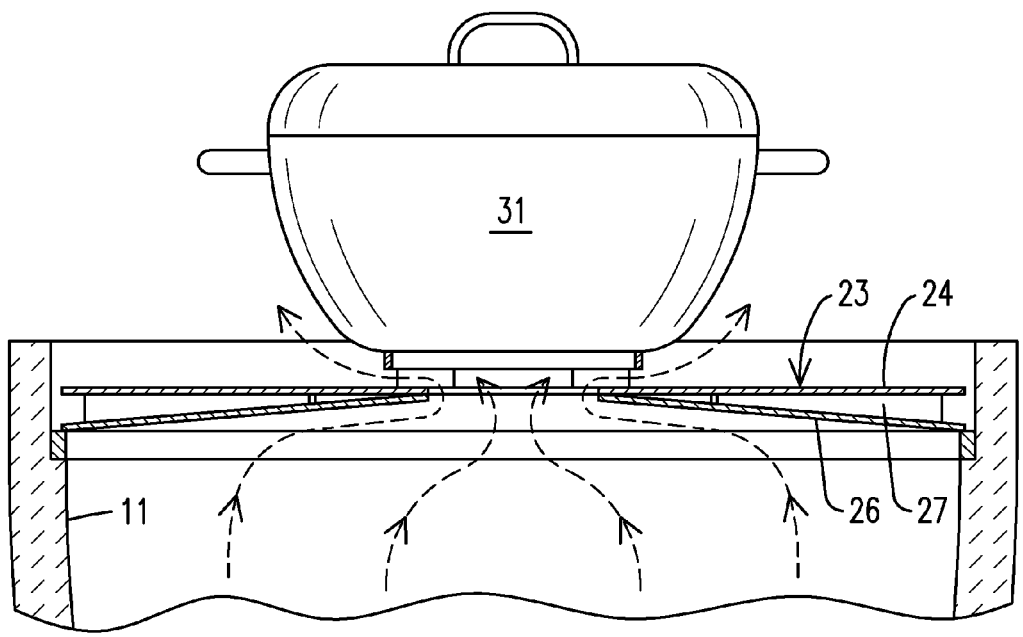
FIG. 2 is a partial sectional view of the converted grill of FIG. 1.
Figure 3:
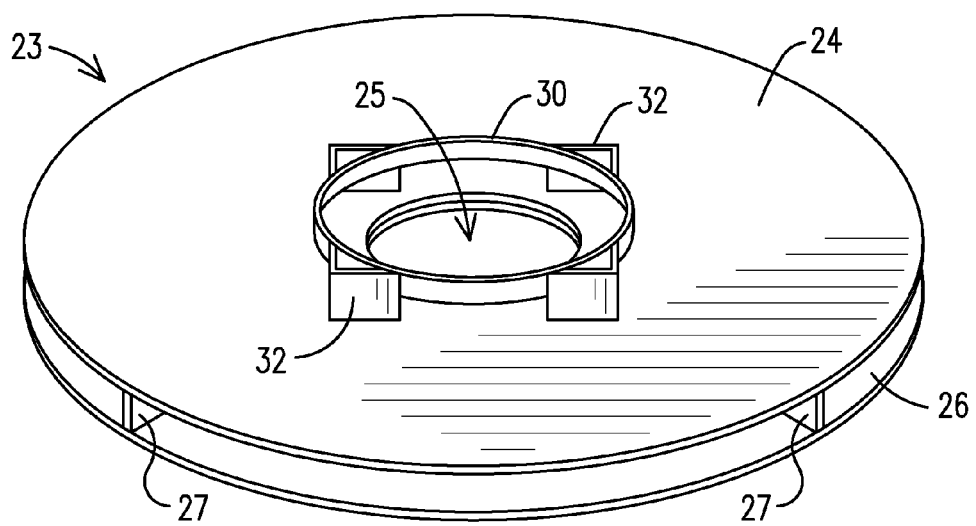
FIG. 3 is a perspective view of the stove plate used in the grill conversion of FIG. 1.
Figure 4:
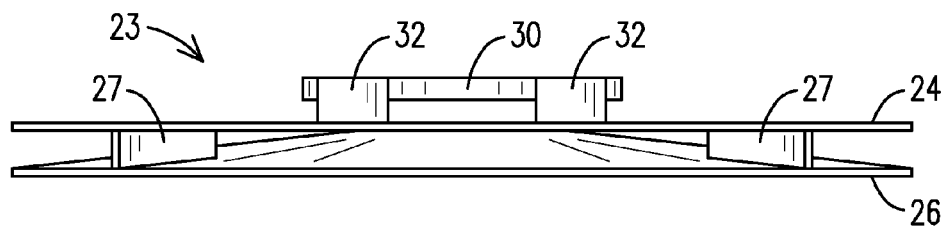
FIG. 4 is a sectional view of the stove plate of FIG. 3.

As seen in FIGS. 1 through 4, a stove plate 23 is sized to cover the grate 15 and has a generally flat top plate 24 having a center opening therein. A bottom generally truncated cone shaped bottom plate 26 also has an open center portion having the opening aligned with the opening through top plate 24. The bottom plate 26 is attached to the top plate 24 with a plurality of spacing members 27 and also along the edge of the opening so that the stove plate 23 has better control of the rising heat in the grill 10 where the heat is blocked from the direct heating of the top plate 24 and the rising heated air is directed by the cone shape of the bottom plate 26 into the opening 25 through the plates 24 and 26 as seen in FIG. 2. The top plate 24 of the stove plate 23 has a container support 30 encircling the opening 25, which may be ringed shaped, for supporting a container such as a pot 31. The container support 30 has a plurality of legs 32 holding the support 30 spaced from the top plate 24. Four legs 32 are shown in FIG. 3 but may be any number desired. The container support 30 is supported above the top plate 24 leaving a space 33 thereunder. This allows the rising heated air to impinge upon the container 31 and then be directed through the open area 33 and around the container 31. This allows the heating of the container from the gas burner in a more uniform way so that food can be cooked and allows food to be heated without burning the food. In FIG. 8 the dashed arrows show the flow of heated air from the burner around the container 31.

This conversion can be rapidly accomplished in the present case and allows food to be grilled on the grill grate or smoked in the grill and also to be quickly converted to a stove top for cooking on the same grill.

The stove plate 23 as seen in all the Figures has the top and bottom plates 24 and 26 spaced with the spacers 27 which hold the bottom generally conical plate 26 to the top plate 24. The conical shape converges on the opening 25 in each plate and directs rising heated air into the center opening 25 against a container 31 and then through the bottom of the container support 30 held in a raised position by the fixed feet 32. This allows the heated air to escape around the container when a pot or pan is placed on the stove plate 23.

It should be clear at this time that a charcoal cooking grill 10 can be quickly converted to a gas grill having a stove top which allows for cooking food in containers while still being able to grill on the grill grate. However the present invention is not to be considered limited to the forms shown which are to be considered illustrative rather than restrictive.

I claim:

1. A method of converting a charcoal to a gas grill comprising the steps of:
    selecting a charcoal grill having a housing having a top portion and a bottom portion having an air inlet and an opening cover having an outlet therethrough, said grill having a grilling grate therein;
    selecting a gas burner having a gas hose for feeding gas thereto;
    attaching said gas burner to said charcoal grill through said air inlet in a bottom portion of said housing;
    selecting a stove plate shaped to generally cover said grate in said housing, said stove plate having a covering plate portion having a center opening therethrough and having a container supporting ring encircling said center opening, said container supporting ring being shaped to support a cooking container and having a plurality of legs spacing said supporting ring from said covering plate thereby allowing heat passing through said covering plate center opening to pass between said container supporting ring and cover plate when said container supporting ring is supporting a container; and
    opening said charcoal grill cover and positioning said stove plate over said grate to thereby convert a charcoal grill to a gas grill.

2. The method of converting a charcoal to a gas grill in accordance with claim 1 including the step of positioning said selected stove plate onto said grilling grate.

3. The method of converting a charcoal to a gas grill in accordance with claim 2 in which said stove plate has a generally conical bottom plate attached thereunder attached to said cover plate.

4. The method of converting a charcoal to a gas grill in accordance with claim 3 in which said stove plate cover plate is a generally flat plate.

5. The method of converting a charcoal to a gas grill in accordance with claim 1 in which said selected stove plate covering plate has four legs spacing said center container supporting ring therefrom.

6. The method of converting a charcoal to a gas grill in accordance with claim 3 in which a plurality of spacing members are attached between said generally conical bottom plate and said cover plate.

7. The method of converting a charcoal to a gas grill in accordance with claim 6 including the step of attaching said gas burner gas hose to a source of gas.

8. A gas grill comprising:
    a grill housing having a top portion and a bottom portion and having an air inlet on the bottom portion thereof and a cover having an outlet therethrough, said grill having a grilling grate therein;
    a gas burner mounted in the bottom portion of said grill housing and having a gas hose extending through said grill housing air inlet; and
    a stove plate mounted over said grilling grate and shaped to generally cover said grilling grate in said housing, said stove plate having a covering plate portion having an center opening therethrough and having a container supporting ring encircling said center opening, said container supporting ring shaped to support a cooking container and having a plurality of legs spacing said supporting ring from said covering plate to thereby allow heat passing through said covering plate center opening to pass between said container supporting ring and cover plate when said container supporting ring is supporting a container.

9. The gas grill in accordance with claim 8 in which said stove plate has a generally truncated conical bottom plate having an open center attached under said cover plate for directing rising heat into said cover plate center opening.

10. The gas grill in accordance with claim 9 in which each said in which said stove plate cover plate is a generally flat plate.

11. The gas grill in accordance with claim 10 including a plurality of spacing members attached between said generally conical bottom plate and said cover plate spacing said conical bottom plate from said cover plate.

12. The gas grill in accordance with claim 11 in which said stove plate covering plate has four legs spacing said center container supporting ring therefrom.

13. A stove plate comprising:
a stove plate shaped to generally cover a grilling grate in a grill, said stove plate having a covering plate portion having a center opening therethrough and having a container supporting ring encircling said center opening, said container supporting ring shaped to support a cooking container and having a plurality of legs spacing said supporting ring from said covering plate to thereby allow heat passing through said covering plate center opening when said stove plate is mounted in a grill to pass between said container supporting ring and said cover plate when said container supporting ring is supporting a container and said stove plate having a generally truncated conical bottom plate having an open center attached under said cover plate for directing rising heat when said stove plate is mounted in a grill into said cover plate center opening.

14. The stove plate in accordance with claim in which said stove plate cover plate is a generally flat plate.

15. The stove plate in accordance with claim 14 in which said plate covering plate has four legs spacing said center container supporting ring therefrom.

16. The stove plate in accordance with claim having a plurality of spacing members attached between said generally conical bottom plate and said cover plate.

* * * * *